United States Patent
Cory

(10) Patent No.: US 7,623,660 B1
(45) Date of Patent: Nov. 24, 2009

(54) METHOD AND SYSTEM FOR PIPELINED DECRYPTION

(75) Inventor: Warren E. Cory, Redwood City, CA (US)

(73) Assignee: Xilinx, Inc., San Jose, CA (US)

( * ) Notice: Subject to any disclaimer, the term of this patent is extended or adjusted under 35 U.S.C. 154(b) by 927 days.

(21) Appl. No.: 11/048,443

(22) Filed: Feb. 1, 2005

Related U.S. Application Data

(60) Provisional application No. 60/589,869, filed on Jul. 20, 2004.

(51) Int. Cl.
*B04N 7/167* (2006.01)
(52) U.S. Cl. ...................................... 380/200; 713/168
(58) Field of Classification Search .................... 380/43, 380/200, 28, 29, 289, 268; 708/520; 725/31; 713/168
See application file for complete search history.

(56) References Cited

U.S. PATENT DOCUMENTS

| | | | |
|---|---|---|---|
| 5,365,589 A * | 11/1994 | Gutowitz | 380/43 |
| 5,974,473 A | 10/1999 | Leavitt et al. | |
| 6,092,123 A | 7/2000 | Steffan et al. | |
| 6,204,687 B1 | 3/2001 | Schultz et al. | |
| 6,496,971 B1 | 12/2002 | Lesea et al. | |
| 6,629,311 B1 | 9/2003 | Turner et al. | |
| 6,738,962 B1 | 5/2004 | Flaherty et al. | |
| 6,920,627 B2 | 7/2005 | Blodget et al. | |
| 7,167,025 B1 | 1/2007 | Schmit et al. | |
| 7,170,997 B2 * | 1/2007 | Petersen et al. | 380/268 |
| 7,171,548 B2 | 1/2007 | Smith et al. | |
| 7,287,155 B2 | 10/2007 | Fujii et al. | |
| 7,328,335 B1 | 2/2008 | Sundararajan et al. | |
| 7,373,506 B2 * | 5/2008 | Asano et al. | 713/168 |
| 7,406,176 B2 * | 7/2008 | Zhu et al. | 380/200 |
| 7,406,673 B1 | 7/2008 | Patterson et al. | |
| 2003/0018892 A1 | 1/2003 | Tello | |
| 2003/0108199 A1 * | 6/2003 | Pinder et al. | 380/200 |
| 2003/0174835 A1 * | 9/2003 | Yokota et al. | 380/28 |
| 2004/0049609 A1 | 3/2004 | Simonson et al. | |
| 2005/0100161 A1 * | 5/2005 | Husemann et al. | 380/200 |
| 2005/0108313 A1 * | 5/2005 | Fujisaki et al. | 708/520 |
| 2006/0031873 A1 * | 2/2006 | Fahrny et al. | 725/31 |
| 2006/0177052 A1 * | 8/2006 | Hubert | 380/29 |

OTHER PUBLICATIONS

"Des Modes of Operation", FIPS Pub. 81, Dec. 2, 1980, download from http://www.itl.nist.gov/fipspubs/fip81.htm on Apr. 30, 2003, 29pgs. "Advanced Encryption Standard (AES)", FIPS Pub. 197, Nov. 26, 2001, 51pgs.*

(Continued)

*Primary Examiner*—Kambiz Zand
*Assistant Examiner*—Monjour Rahim
(74) *Attorney, Agent, or Firm*—Samuel G. Campbell, III; John J. King

(57) ABSTRACT

A method and system for pipelined decryption is disclosed. One embodiment includes a circuit having an iterative calculation section and a cipher text storage section in support of cipher block chaining (CBC) encryption mode. The iterative calculation section may be pipelined and configured to process multiple ciphertexts at once for increased throughput.

76 Claims, 10 Drawing Sheets

OTHER PUBLICATIONS

U.S. Appl. No. 10/956,884, filed Oct. 1, 2004, Sundararajan et al.

National Institute of Standards and Technology, "Recommendation for Block Cipher Modes of Operation, Methods and Techniques," NIST Special Publication 800-38A, Dec. 2001, pp. 1-66, available from the National Institute of Standards and Technology (NIST), National Technical Information Services (NTIS), 5285 Port Royal Road, Springfield, Virginia 22161, USA, or http://csrc.nist.gov/publications/.

National Institute of Standards and Technology, "The Advanced Encryption Standard Algorithm Validation Suite (AESAVS)," Nov. 15, 2002, pp. 1-52, available from the National Institute of Standards and Technology(NIST), National Technical Information Services (NTIS), 5285 Port Royal Road, Springfield, Virginia 22161, USA, or http://csrc.nist.gov/publications/.

National Institute of Standards and Technology, "Advanced Encryption Standard (AES)," FIPS Pub. 197, Nov. 26, 2001, pp. 1-51, available from the National Institute of Standards and Technology (NIST), National Technical Information Services (NTIS), 5285 Port Royal Road, Springfield, Virginia 22161, USA, or http://csrc.nist.gov/publications/.

National Institute of Standards and Technology, "DES Modes of Operation," FIPS Pub. 81, Dec. 2, 1980, pp. 1-27, available from the National Institute of Standards and Technology (NIST), National Technical Information Services (NTIS), 5285 Port Royal Road, Springfield, Virginia 22161, USA, or http://csrc.nist.gov/publications/.

* cited by examiner

METHOD AND SYSTEM FOR PIPELINED DECRYPTION

CROSS REFERENCE

This patent application claims priority to and incorporates by reference the U.S. provisional patent application, Ser. No. 60/589,869, entitled "Method and System for Pipelines Decryption", by Cory, filed Jul. 20, 2004.

BACKGROUND OF THE INVENTION

1. Field of the Invention

This invention relates to the field of encryption, and more particularly relates to a method and system for pipelined decryption.

2. Description of the Related Art

Encryption refers to the process of encoding information (plaintext) into a form that is unreadable (ciphertext) without decoding (decryption). Thus, an unintended third party is unable to recover the meaning of the message, if that party has intercepted the encrypted message. Conversely, decryption refers to the process of recovering the plaintext of an encrypted message after the encrypted message has been received.

In today's technology environment, many applications for encryption techniques exist. For example, such techniques can be used in a network such as the Internet. Such a network may connect thousands of network nodes, including routers, bridges, hubs, servers, and user terminals, which can lead to opportunities for information transmitted across such networks to be diverted surreptitiously. As a result of this susceptibility of messages in transit to interception by unintended third parties, security can be of great concern in transmitting a message from a source node to a destination node in such a network. This problem is typically addressed by encrypting a message at the source node, prior to transmission, and then decrypting the message at the destination node, after reception.

Another application of encryption is the protection of a programmable logic device's (PLD's) configuration bitstream from examination. To do so, software can be designed to encrypt a configuration bitstream that is stored off-chip. The PLD is then made to include a decryptor capable of decrypting the encrypted configuration bitstream, and so allow its use in configuring the PLD.

Commonly, encryption/decryption algorithms use a key selected by the user to transform a block of some fixed length into the corresponding encrypted (decrypted) block. If the data to be encrypted (decrypted) is longer than the fixed length, the data may be divided into blocks of the requisite length and the algorithm applied to each block successively. FIGS. 1 and 2 (described subsequently) depict such a process, in which the block length is fixed (e.g., at 128 bits). The functions described in connection therewith are well known, and are further described in various publications (e.g., NIST Special Publication 800-38A, Recommendation for Block Cipher Modes of Operation: Methods and Techniques, 2001 Edition, by M. Dworkin).

FIG. 1 is a set of process diagrams illustrating examples of an encryption process (depicted in FIG. 1 as an encryption process 100) and a decryption process (depicted in FIG. 1 as a decryption process 110) according to the prior art. FIG. 1 depicts the basic operations performed under the Advanced Encryption Standard (AES) Electronic Codebook (ECB) Mode (Federal Information Processing Standard (FIPS) Publication 197), in which plaintext is unencrypted data and ciphertext is encrypted data. Encryption process 100 begins with the reception of plaintext 120. Plaintext 120 is divided into a number of input blocks (represented in FIG. 1 by an input block 122). Input block 122 is provided to an encryption unit 124 for encryption. Encryption unit 124 encrypts input block 122, and provides this encrypted information as a number of output blocks (represented in FIG. 1 by an output block 126). These output blocks are combined to form ciphertext 128.

In a similar manner, decryption process 110 takes in ciphertext 130 as a number of ciphertext blocks (represented by ciphertext block 132). Ciphertext block 132 is provided to a decryption unit 134. Decryption unit 134 decrypts the encrypted information, and outputs the result as an output block 136. Output block 136, representing a number of such output blocks, is combined with these other output blocks, in order to produce plaintext 138.

A weakness of this method is that, for any given key, identical plaintext blocks are always encrypted into the same ciphertext, so that patterns of repeated plaintext blocks may be inferred by detection of repeated ciphertext blocks. To disguise the repetition of plaintext blocks, encryption/decryption algorithms can use Cipher Block Chaining (CBC) Mode, in which the ciphertext for the prior block is exclusive-or'ed (XOR'd) with the current block before encryption and after decryption. Such a process is presented and described in connection with FIG. 2.

FIG. 2 is a block diagram illustrating the Cipher Block Chaining (CBC) mode of encryption and decryption according to NIST recommendations (NIST Special Publication 800-38A) and other sources. A secure system 200 includes an encryption unit 205 and a decryption unit 210. Encryption unit 205 encrypts plaintext into ciphertext for secure communication to decryption unit 210, which then decrypts the ciphertext into plaintext. These components are now described in greater detail.

Encryption unit 205 receives plaintext data (not shown) as a number of data blocks 210(1)-(N). Each of data blocks 210(1)-(N) is pre-processed to generate input blocks 215(1)-(N). Each of input blocks 215(1)-(N) is then encrypted by a corresponding one of encryption units 220(1)-(N). Encryption units 220(1)-(N) output the encrypted version of a corresponding one of input blocks 215(1)-(N), as a corresponding one of ciphertext blocks 225(1)-(N). Ciphertext blocks 225(1)-(N) are then ready for communication to decryption unit 210.

Each of ciphertext blocks 225(1)-(N-1) is also input to a corresponding one of exclusive-OR (XOR) units 230(1)-(N) (specifically, a corresponding one of XOR units 230(2)-(N)). XOR unit 230(1) is a special case (having no preceding ciphertext block to take as input), and so takes an encryption initialization vector 235 as its input. Thus, the pre-processing performed on each of data blocks 210(1)-(N) is an XOR performed by each of XOR units 230(1)-(N) between a corresponding one of data blocks 210(2)-(N) and a preceding one of ciphertext blocks 225(1)-(N-1) (the exception being the case of data block 210(1), as noted).

As can be seen in FIG. 2, decryption unit 210 operates in a manner similar to that of encryption unit 205. Each of ciphertext blocks 225(1)-(N) is received at decryption unit 210 as a corresponding one of ciphertext blocks 240(1)-(N). Each of ciphertext blocks 240(1)-(N) is decrypted by a corresponding one of decryption units 245(1)-(N). The decryption of ciphertext blocks 240(1)-(N) by a corresponding one of decryption units 245(1)-(N) results in a corresponding one of output blocks 250(1)-(N). Each of output blocks 250(1)-(N) are then provided to a corresponding one of XOR units 255(1)-(N).

Each of XOR units 255(2)-(N) also takes as an input the ciphertext block received by the preceding stage (specifically, the preceding one of ciphertext blocks 240(1)-(N-1)), with XOR 255(1) being the exception, in taking as its input a decryption initialization vector 260 (in addition to output block 250(1)). As is known, initialization vector 260 is the same as initialization vector 235.

As will be appreciated, a given one of data blocks 210(1)-(N) cannot be processed and provided to a corresponding one of input blocks 215(1)-(N), until the preceding data block is encrypted (and so the requisite ciphertext block is available) (save for data block 210(1), which begins the process by using encryption initialization vector 235 in the exclusive-OR process). As will also be appreciated, since plaintext data is broken into data blocks, the time required to encrypt the data is dependent on the number of data blocks into which the plaintext data is broken into (and so the number of encryption stages employed).

In a similar fashion, the exclusive-OR'ing of each output block with its preceding ciphertext block in decryption unit 210 results in a corresponding one of data blocks 265(1)-(N). As will be appreciated, in certain scenarios, ciphertext blocks 240(1)-(N) is received in a staggered fashion, leaving later ones of decryption units 245(1)-(N) waiting for some period of time. If ciphertext blocks 240(1)-(N) are received in such a staggered fashion, the delays noted previously with regard to the operation of encryption unit 205 will also be experienced within decryption unit 210. Alternatively, if ciphertext blocks 225(1)-(N) are buffered until all such ciphertext blocks are available, ciphertext blocks 240(1)-(N) will be received at the same time. In either case, however, the infrastructure required by such design will be substantial in relative terms.

What is therefore desired is a decryption architecture that is capable of decrypting standard encryption formats, while consuming a minimal (or acceptable) amount of resources in its implementation. Preferably, such an approach should allow the designer freedom in making design choices, by allowing the designer to trade off the size of such a design for the speed provided thereby.

SUMMARY

The present invention addresses these and other needs by providing a pipelining technique for increasing the throughput of a given decryption process. In such an embodiment, a multiple-stage "round" pipeline and other pipeline stages are used to increase the throughput of such a decryption unit. An important feature of such a decryption unit's operation is the pipelining of ciphertext values to support the final step in the decryption. Multiple copies of the "round" pipeline can be used to further increase such a decryption unit's throughput. Moreover, in cases where each such stage performs the same (or a similar) computation, the amount of resources required for the overall computation is reduced by having only a single stage that performs each such operation in an iterative fashion.

An exemplary embodiment of the present invention includes a circuit having an iterative calculation section and a cipher text storage section in support of cipher block chaining (CBC) encryption mode. The iterative calculation section may be pipelined and configured to process multiple ciphertexts at once for increased throughput.

Another embodiment includes an intermediate stage, such as a round stage, including comprising a storage section having a first plurality of storage units, and a calculation section having a second plurality of storage units, and a plurality of calculation units, wherein the second plurality of storage units and the plurality of calculation units are coupled in series with one another, and the each one of the calculation units is configured to perform a portion of a decryption operation. The storage section is coupled in parallel with the calculation section and each of the calculation units may be directly coupled to a corresponding storage unit of the second plurality of storage units. Further, the first plurality of storage units may be coupled in parallel. A storage unit can be a volatile memory circuit such as a register or a non-volatile memory circuit such as a floating gate circuit In one embodiment, a circuit is disclosed. The circuit includes a round stage. In certain aspects of this embodiment, the round stage includes an iterative calculation section and a ciphertext storage section in support of cipher block chaining (CBC) encryption mode. The iterative calculation section can be pipelined and configured to process multiple ciphertexts at once, for increased throughput.

In another embodiment, a circuit is disclosed. The circuit includes a round stage. In certain aspects of this embodiment, the round stage includes a storage section and an iterative calculation section. The storage section is coupled at a first input to an input of the round stage and the storage section is coupled at a first output to an output of the round stage. The iterative calculation section is coupled at a second input to the input of the round stage and the storage section is coupled at a second output to the output of the round stage.

In yet another embodiment, a circuit is disclosed. The circuit includes an input stage, at least one intermediate stage and an output stage. The input stage is configured to perform a first calculation. The first calculation is a first portion of a decryption operation. The intermediate stage is configured to perform an intermediate calculation, and is configured to perform the intermediate calculation a plurality of times. The intermediate calculation is an intermediate portion of a decryption operation. The output stage is configured to perform a final calculation. The final calculation is a final portion of a decryption operation.

In still another embodiment, a method is disclosed. The method includes generating processed ciphertext information by iteratively performing intermediate processing on intermediate ciphertext information. The intermediate processing is an intermediate portion of a decryption operation.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1:
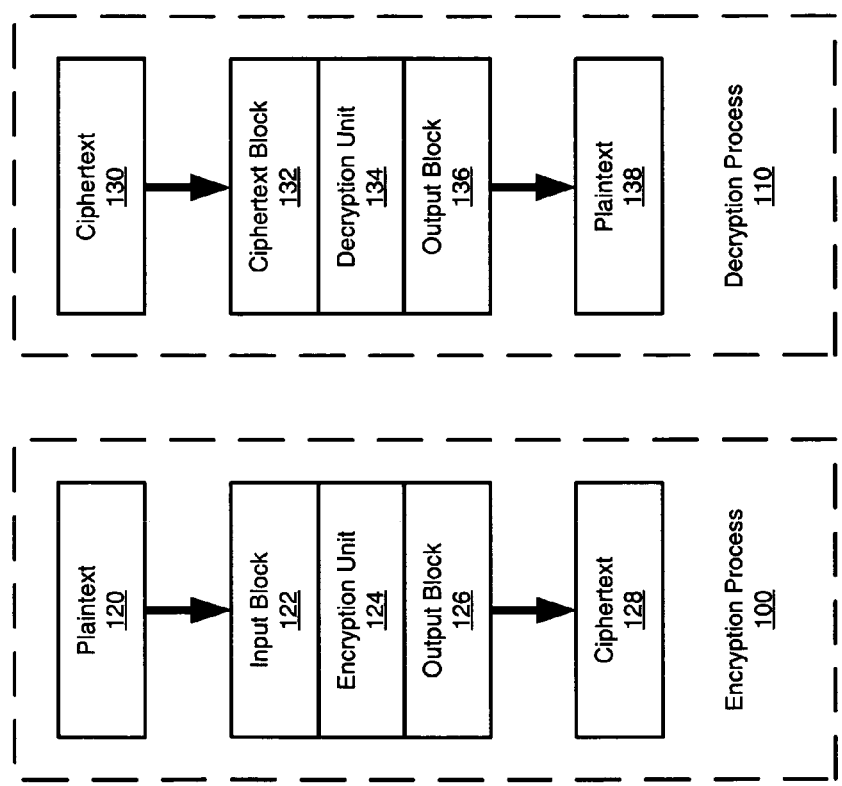
FIG. 1 is a set of process diagrams illustrating examples of encryption and decryption processes according to the prior art.
Figure 2:
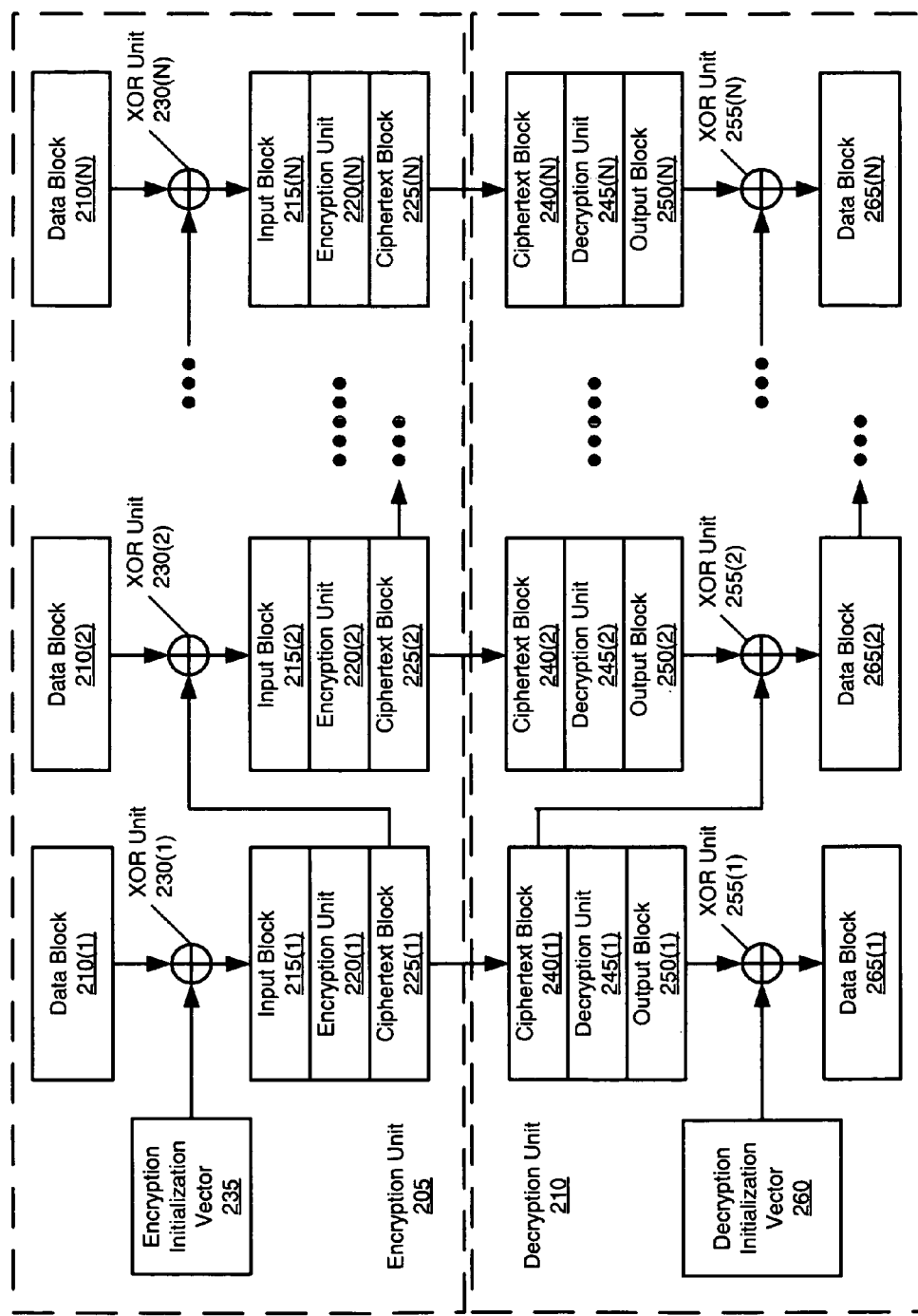
FIG. 2 is a block diagram illustrating the Cipher Block Chaining (CBC) mode of encryption and decryption.

The following is intended to provide a detailed description of an example of the invention and should not be taken to be limiting of the invention itself. Rather, any number of variations may fall within the scope of the invention which is defined in the claims following the description.

Introduction

The present invention provides a pipelining technique for increasing the throughput of a given decryption process. For example, such an approach can be used with AES decryption with CBC. As will be appreciated, cipher block chaining (CBC) is not specifically a feature of AES, but is a technique that can be used with many different encryption algorithms (symmetric key block cipher algorithms).

In such an embodiment, a multiple-stage (e.g., a two-stage) "round" pipeline and other pipeline stages are used to increase the throughput of such a decryption unit. For example, such techniques can be used to implement an AES decryption unit with CBC, as noted. An important feature of such a decryption unit's operation is the pipelining of ciphertext values to support the final step in the decryption. Multiple copies of the "round" pipeline can be used to further increase such a decryption unit's throughput.

For example, a module performing a portion of the computations performed during decryption can use registers to break the computation into smaller operations. In such a scenario, one rising clock edge strobes the input data into an input register. During the ensuing clock cycle, the module (or sub-module) carries out its computation. The final result is strobed into the output register of the last stage on the following rising clock edge (while new input data is simultaneously strobed into the input register). The maximum clock speed is limited by the complexity of the operation that must occur in this module (sub-module), and so the time required thereby.

In a pipelined version of the same computation, each stage has an output register into which the clock strobes the stage's result. Since the complexity of the computation that must occur in a single clock cycle is reduced, the maximum clock speed can be increased substantially. The time to process a single given input block (the latency) may well increase, because the increase in maximum clock speed is more than offset by the additional number of clock cycles required to process a given block. However, because the computational module can now be processing a number of different input blocks simultaneously (one per stage), the total throughput (amount of data processed per second) of the computation module will increase. Note that a new output block is available at each rising clock edge, so any increase in the maximum clock speed implies a corresponding increase in throughput.

Moreover, if each stage performs the same (or a similar) computation, then the amount of hardware resources required for the overall computation can be reduced by having only a single stage that performs each step in successive clock cycles. Initially, the clock strobes input data into the input register, which is selected for the module's computation during the next clock cycle. On the next rising clock edge, the result for the present step is strobed into the output register, which is then selected for the module's computation during the next clock cycle. This is repeated until the requisite calculations are completed, with the final result available on the output data.

Pipelined AES decryption with CBC according to an exemplary embodiment of the present invention is implemented in light of the fact that the final encrypted result for one ciphertext block is available with or before the next ciphertext block. The ciphertext of one input block is therefore immediately available for use in the decryption of the next input block, and so, well before the former ciphertext is needed. The exemplary embodiment of invention recognizes that this is the case, and is thus able to implement the algorithm on the receiver of such encrypted information (e.g., the FPGA chip) in a pipelined, iterative fashion. The exemplary embodiment of invention applies this pipelining and iterated computation to achieve high throughput at reasonable hardware cost. Variants of the basic concept can achieve even higher throughputs (typically at the cost of additional hardware).

In the examples that follow, embodiments of the present invention that implement AES decryption with CBC are described. As will be appreciated, such implementations do not employ a pure pipeline (e.g., with each pipeline stage always presenting its result to the next stage). The round stage pipeline is a pipeline that can process multiple input values simultaneously, but does so while performing computations in an iterative fashion (and so, for example, a round stage may present its output to its own input). Moreover, it will also be appreciated that techniques according to the present invention can be employed when implementing decryption methods other than AES decryption.

Example Architectures for Pipelined Decryption

In one embodiment, a decryption unit according to the present invention performs a sequence of operations as defined by the AES standard, with Cipher Block Chaining (CBC). A further description of the AES decryption algorithm given below can be found in FIPS 197 issued on Nov. 26, 2001 by the United States National Institute of Standards and Technology (NIST), (found on the Internet at http://www.csrc.nist.gov/publications/fips/fips197/fips-197.pdf) which is herein incorporated by reference. The exact nature of each operation is not critical, except to note that each can be done as a combinational computation:

AddRoundKey

The following sequence, some number of time (13 times, in one embodiment)

InvShiftRows

InvSubBytes

AddRoundKey

InvMixColumns

InvShiftRows

InvSubBytes

AddRoundKey

XOR previous ciphertext

The sequence of operations

InvShiftRows
InvSubBytes
AddRoundKey
InvMixColumns is referred to herein as a "round", so the decryption operation can also be described as follows.

AddRoundKey
Some number of rounds (e.g., 14), omitting InvMixColumns in the last iteration
XOR the result with the previous ciphertext A straightforward implementation might compute an entire round in a single clock cycle, iterating to carry out the bulk of the decryption algorithm in 14 clock cycles. However, it may not be possible to achieve the desired clock rate with such an implementation (in the case where the desired clock rate is relatively high), so a decryption unit of an embodiment of the present invention is be configured to compute each round over multiple clock cycles.

Figure 3:
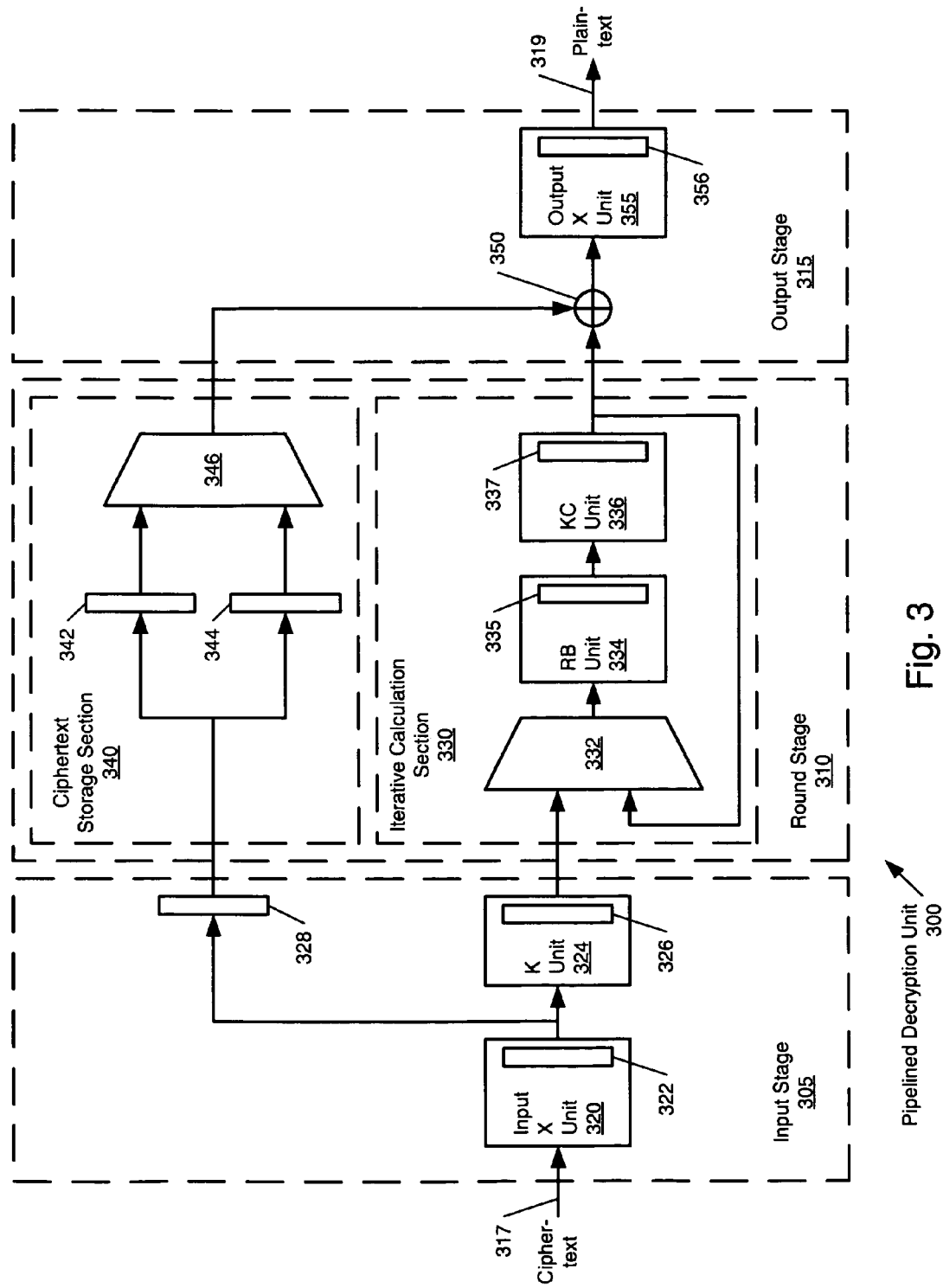
FIG. 3 is a block diagram illustrating a pipelined decryption unit of the present invention.

FIG. 3 is a block diagram illustrating a pipelined decryption unit 300 according to an embodiment of the present invention. Pipelined decryption unit 300 includes an input stage 305, a round stage 310, and an output stage 315. Input stage 305 receives ciphertext 317, and after processing this information, provides the results to round stage 310. Round stage 310 performs iterative processing on these results, and provides subsequent results to output stage 315. Output stage 315, after performing post-processing of these subsequent results, outputs the resulting information as plaintext 319. The components of, and operations performed by, input stage 305, round stage 310 and output stage 315 are now discussed in greater detail.

Input stage 305 receives ciphertext 317 at an input X unit 320. Input X unit 320 includes an input X unit register 322, which stores the results generated by input X unit 320. Input X unit 320, via input X unit register 322, provides its results to a K unit 324. K unit 324 includes a K unit register 326, which stores the results generated by K unit 324 until those results are needed in round stage 310. Input X unit 320, again via input X unit register 322, also provides its results to an input register 328. Collectively, K unit register 326 and input register 328 provide the requisite information to round stage 310.

Round stage 310 receives the results provided by K unit register 326 at an iterative calculation section 330. Iterative calculation section 330 includes a multiplexer 332, which receives the output of K unit 324 via K unit register 326 at one of its inputs. Multiplexer 332 also receives the output of iterative calculation section 330 at another of its inputs, thereby allowing the output of iterative calculation section 330 to be fed back into iterative calculation section 330. In this manner, calculations are performed on the results generated by K unit 324 in an iterative fashion.

After selecting either the output of K unit 324 or the output iterative calculation section 330, multiplexer 332 provides the selected input to a RB unit 334. RB unit 334 performs certain processing on its input, and subsequently stores the result in a RB unit register 335. At the appropriate time, RB unit register 335 provides this result to a KC unit 336. KC unit 336 performs certain processing on this result, and stores its result in a KC unit register 337. As can be seen in FIG. 3, the output of KC unit register 337 is the output of iterative calculation section 330. At this point, this result can be used by output stage 315 (assuming that the requisite processing has been completed), or as an input to iterative calculation section 330 (as selected by multiplexer 332).

It will be appreciated that the mnemonic "K" refers to "add round Key". The mnemonic "RB" refers to "Row rotation, Byte substitution," which are the first two steps of a decryption round. The mnemonic "KC" refers to "add round Key, inverse mix Columns," the last two steps of a decryption round.

As noted earlier, the output of input X unit 320, via input X unit register 322, is provided to input register 328. Input register 328 provides the ciphertext thus stored to round stage 310, and in particular, to a ciphertext storage section 340. Ciphertext storage section 340 alternates between storing ciphertext from input register 328 into a register 342 and a register 344. Once the requisite iterative calculations have been performed by iterative calculation section 330, an appropriate one of registers 342 and 344 are selected by a multiplexer 346, and the ciphertext stored therein provided to output stage 315, in tandem with the output of iterative calculation section 330. This selection process is discussed in greater detail below.

Output stage 315, in turn, receives the output of iterative calculation section 330 and ciphertext from ciphertext storage section 340 at an exclusive-OR (XOR) unit 350. XOR unit 350 performs an exclusive-OR operation between the processed ciphertext and the previous ciphertext (the ciphertext preceding the ciphertext which resulted in the processed ciphertext).

The processed ciphertext is made available by virtue of the fact that register 328 is able to store yet another ciphertext. By doing so, register 328 actually serves as an additional ciphertext pipeline stage. When register 326 with the current ciphertext (after one AddRoundKey operation) is consumed by round stage 310, register 328 (consumed at the same time) still holds the previous ciphertext. After round stage 310 consumes the previous ciphertext (or, alternatively, simultaneously with this operation), register 328 is loaded with the current ciphertext, for use with the decryption of the next ciphertext. As will therefore be appreciated, registers 326 and 328 are not simultaneously loaded from the same ciphertext.

Once the foregoing calculations are complete, then, XOR unit 350 provides the results to an output X unit 355. Once output X unit 355 has performed the requisite operations on this result (e.g., in one embodiment, multiplexing the resulting plaintext), its results are provided to an output X unit register 356, which stores this information until such time as the information is to be provided as the output of output stage 315 (i.e., plaintext 319).

As will be appreciated, pipelined decryption unit 300 can be configured to perform the operations discussed in connection with AES encryption, using CBC, using a pipelined technique. This is evidenced by the fact that the major computational modules of pipelined decryption unit 300 have registered outputs. In one embodiment, pipelined decryption unit 300 inputs and outputs 32 bits at a time. Input X unit 320 demultiplexes ciphertext 317 into a ciphertext block of the appropriate word width, for example, accumulating 32-bit words into 128-bit ciphertexts (e.g., in the manner of a demultiplexer). The datapath width through the bulk of pipelined decryption unit 300 is then 128 bits.

K unit 324 performs the AddRoundKey on the 128-bit ciphertext (ciphertext 317). RB unit 334 then performs InvShiftRows and InvSubBytes calculations, while KC unit 336 performs AddRoundKey and InvMixColumns calculations (with the option to omit InvMixColumns (for the last round)). XOR unit 350 computes the XOR of the CBC with the previous input ciphertext. Output X unit 355 converts the final 128-bit plaintext into four 32-bit words (in the manner of a multiplexer), for output from pipelined decryption unit 300 as plaintext 319. Output X unit 355 can be modified or removed for external data path widths other than 32 bits, including widths greater than 128 bits. Internal data path widths of other than 128 bits can also be used, depending on the requirements of the decryption algorithm implemented.

As noted, the datapath loops back from KC unit 336 to RB unit 334. In one embodiment, these two modules repeat their operations 14 times over this loop-back path to execute 14 rounds for a single input ciphertext block.

However, this is more than an iterated computation. RB unit 334 and KC unit 336 also form a two-stage pipeline, because the pair are able to work on two ciphertext blocks at the same time. This is made possible by the use of registers (RB unit register 335 and KC unit register 337). A separate round counter for each unit (not shown) tracks the round number for the ciphertext the given unit is decrypting. RB unit 334 and KC unit 336 exchange round counters at each rising clock edge until KC unit 336 is ready to discharge its final round output to XOR unit 350. At that time, RB unit 334 is able to accept a new input from K unit 324 (rather than operating on the result from KC unit 336), while handing its result (for the other ciphertext being decrypted) to KC unit 336 at the same time. In this way, both RB unit 334 and KC unit 336 are kept busy continuously, each processing one of two ciphertext blocks at any given time.

Data ready/module busy handshaking is performed:
between X input unit 320 and K unit 324,
between K unit 324 and RB unit 334, and
between KC unit 336 and output X unit 355

This is done to manage the flow of data through pipelined decryption unit 300. Similarly, the complete decryptor has busy and data ready outputs to control the flow of data into and out of the decryptor. It will be appreciated that ready/busy handshaking throughout the decryption unit is performed by control logic associated with the various modules, in order to ensure that processing by one module is completed prior to the module receiving data from a preceding module. In one embodiment, the ready/busy logic assumes that the decryption unit never needs to wait before sending its ready outputs downstream.

In order to support CBC in a pipelined architecture embodiment of the present invention, the ciphertext inputs are pipelined (stored) until their presentation to the XOR unit 350. Ciphertext storage section 340 depicts this pipeline. At each rising clock on which new data is accepted from K unit 324 into RB unit 334, the contents of input register 328 are also copied into register 342 or register 344. The CBC value copied is the ciphertext input just prior to the ciphertext currently being loaded into RB unit 334. The choice of registers 342 or register 344 is determined by a phase bit (not shown) that also controls which of register 342 or 344 is presented to XOR unit 350. The phase bit toggles state (0, 1, 0, 1, etc.) at each rising clock edge, corresponding to the flow of a given ciphertext input being decrypted between RB unit 334 and KC unit 336. As will be appreciated, other CBC ciphertext pipelining embodiments, and pipelined decryption units in general, are possible, including those employing a first-in, first-out (FIFO) scheme.

Figure 4:
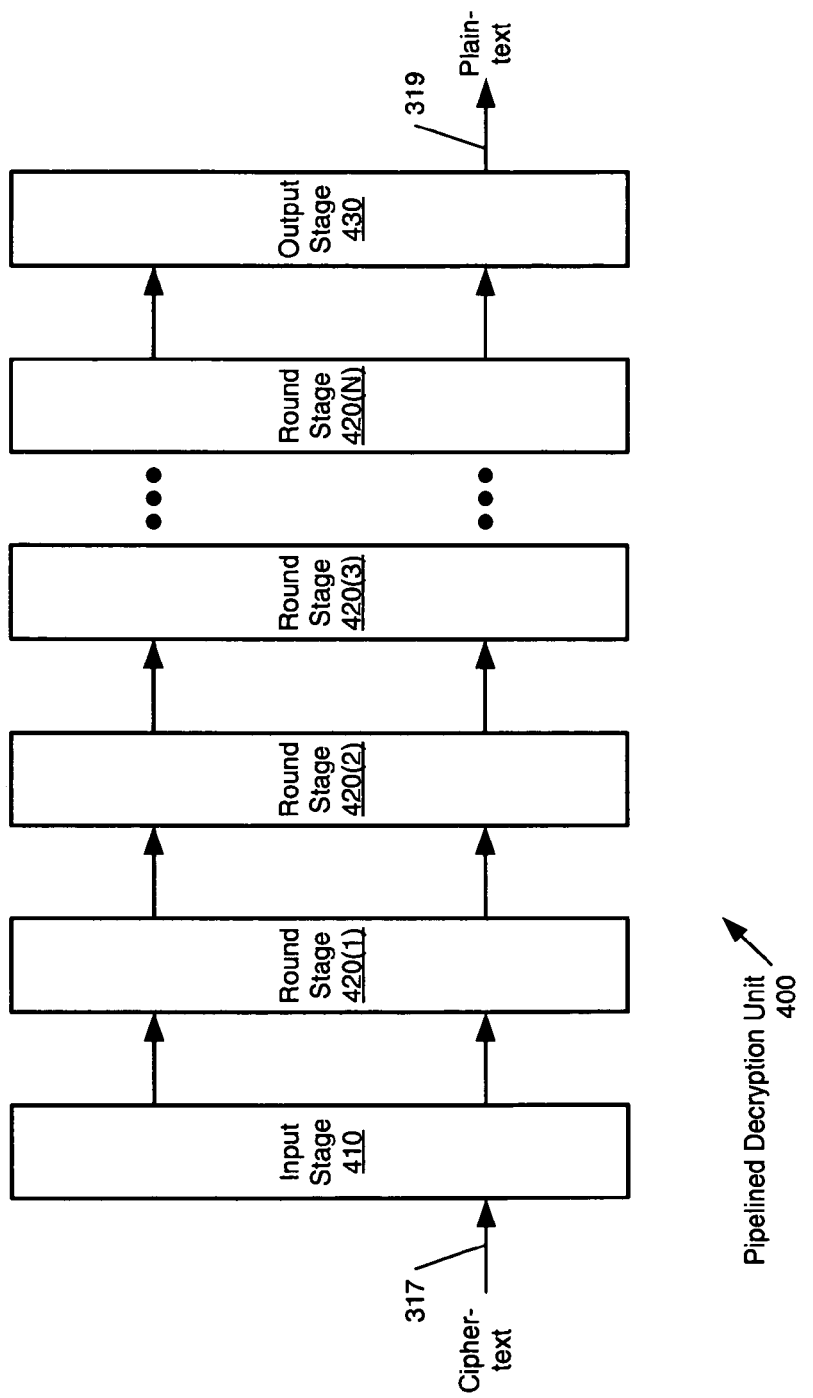
FIG. 4 is a block diagram illustrating a pipelined decryption unit of the present invention having multiple round stages.

As will be appreciated, the architecture of FIG. 3 can decrypt two ciphertext inputs (a total of 256 bits) every 28 clock cycles, for a throughput of 9+ bits per clock cycle. This estimate is based on the following parameters. The architecture of FIG. 3, having two pipeline stages, is able to decrypt two ciphertext inputs at once. Each complete decryption requires 14 rounds, and each such round requires two clock cycles (for the two pipeline stages), resulting in 28 clock cycles being required to decrypt the two ciphertexts. Thus, over 9 bits of ciphertext are processed per clock cycle. It is also possible to replicate round stage 310 in order to increase the throughput further (at the cost of additional hardware). FIG. 4 shows an example of an architecture that employs multiple round stages.

Regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above-described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing describes an embodiment wherein the different components are contained within different other components. It is to be understood that such depicted architectures are merely examples, and that in fact many other architectures can be implemented that achieve the same functionality. Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "[operably] connected", or "[operably] coupled", to each other to achieve the desired functionality.

FIG. 4 is block diagram illustrating a pipelined decryption unit 400 of an embodiment of the present invention having multiple round stages. As will be appreciated from the foregoing discussion in connection with FIG. 3, iterations of the operations performed by each iteration within round stage 310 can in fact be performed by a number of such round stages, as depicted in FIG. 4.

In pipelined decryption unit 400, ciphertext 317 is received at an input stage 410. Input stage 410 provides the same functionality as input stage 305. Input stage 410 again provides a copy of the ciphertext received, as well as a pre-processed version of the ciphertext in the manner of the result generated by K unit 324. This information is provided to the first of a number of round stages (depicted in FIG. 4 as round stages 420(1)-(N)). In the configuration depicted in FIG. 4, round stages 420(1)-(N) are each assumed to perform one "iteration" of the operations iteratively performed by calculation section 330. In fact, depending on the needs of the particular situation, the number of round stages can be adjusted to be any number between one (and so appear as the architecture in FIG. 3) to the maximum number of iterations that needs to be performed (in which case round stages 420(1)-(N) each perform a single "iteration" of the calculations performed, for example, by iterative calculation section 330). If some number between these two limits is employed, one or more of the round stages involved performs multiple iterations of the requisite calculations.

Once the requisite calculations have been performed, the last of round stages 420(1)-(N) (depicted in FIG. 4 as round stage 420(N)) provides its output to an output stage 430, which performs post-processing on the result received thereby, and provides this post-processed result as plaintext 319. As will be appreciated, the operations performed by output stage 430 mirror those performed by output stage 315.

For example, using two round stages, the first round stage computes rounds 1 to 7, and the second round stage computes rounds 8 to 14. This achieves a throughput of 512 bits every 28 clock cycles, or 18+ bits per clock cycle. As noted earlier, it will be noted that the round stages in an architecture according to embodiments of the present invention, such as that of FIG. 4, are not completely identical to each other or to the round stage of FIG. 3. This is due to differences in RB unit and KC unit round counter management, decryption key handling, and inclusion or exclusion of InvMixColumns in the stage's final round. However, the data path logic is substantially the same for the various round stages.

In another example, four round stages are implemented. The four round stages can be configured to compute rounds 1 to 4, 5 to 8, 9 to 12, and 13 to 14, respectively, although other allotments of rounds to the four stages are possible. Such architecture runs with minimal busy waiting, yielding an estimated throughput of 5 Gbps at a clock rate of 200 MHz. Two CBC registers can be used before the first round stage to obtain the highest possible throughput.

Figure 5:
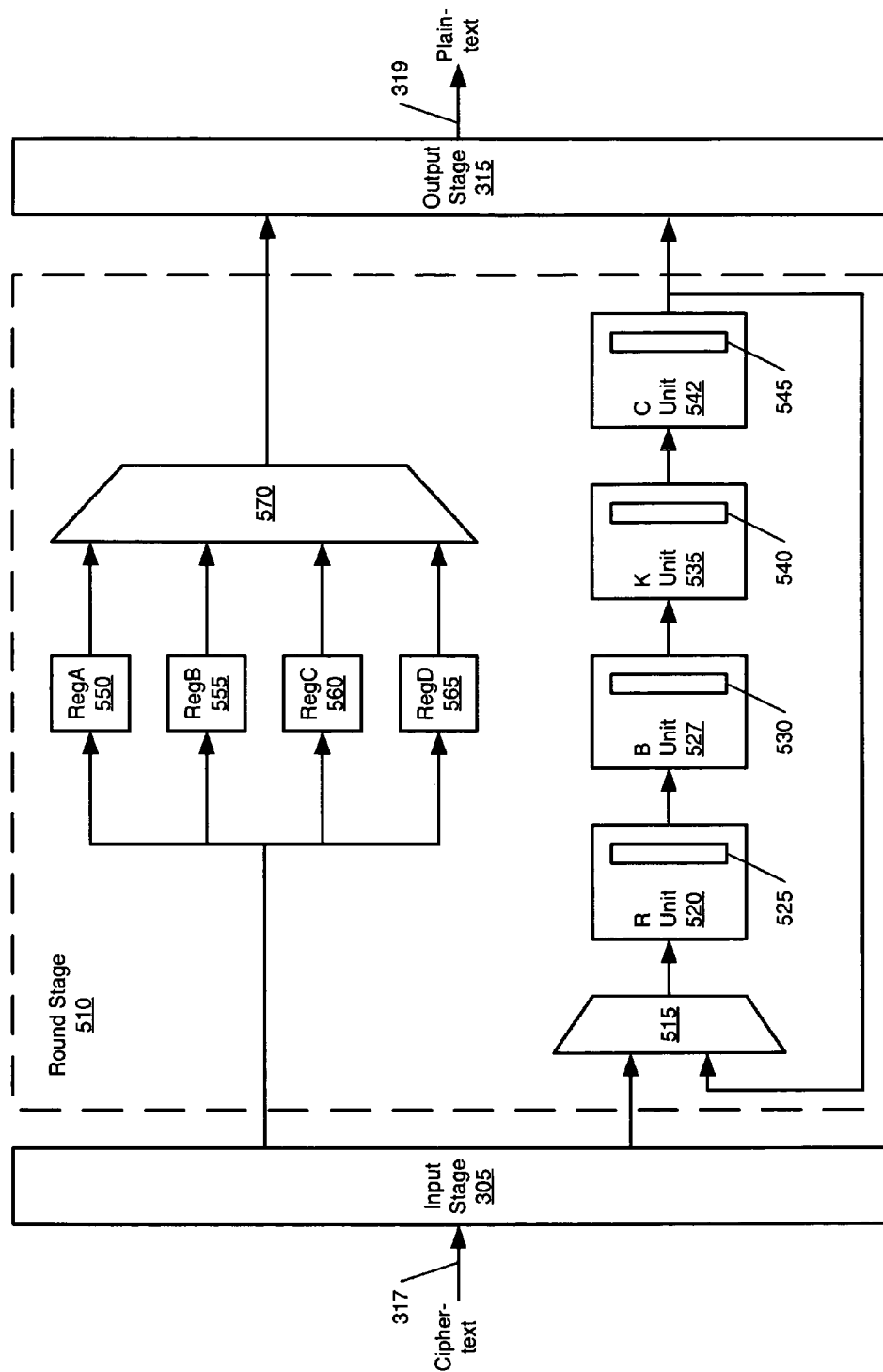
FIG. 5 is a block diagram illustrating a pipelined decryption unit of the present invention having a round stage capable of processing more than two ciphertext blocks.

FIG. 5 is a block diagram illustrating a pipelined decryption unit 500 of the present invention having a round stage 510 capable of processing more than two ciphertext blocks at a time (in the case of pipelined decryption unit 500, four ciphertext blocks at a time). As before, ciphertext 317 is received by input stage 305, which provides the ciphertext and a pre-processed version of the ciphertext to the subsequent round stage (depicted in FIG. 5 as a round stage 510). Also as before, round stage 510 provides ciphertext and a corresponding processed version of the ciphertext to output stage 315 for post-processing, resulting in plaintext 319.

However, in contrast to round stage 310, round stage 510 is capable of processing four ciphertext blocks at one time. This is achieved, in the embodiment depicted in FIG. 5, by splitting the RB and KC calculations into R (InvShiftRows) and B (InvSubBytes) calculations, and K (AddRoundKey) and C (InvMixColumns) calculations, respectively. Storage (e.g., a register) is then inserted after each of these calculations. By thus simplifying the computations that need to occur during each clock cycle, the architecture's clock speed can be increased, resulting in greater throughput.

In this embodiment, round stage 510 receives the pre-processed ciphertext at a multiplexer 515, which selects between this pre-processed ciphertext and the output of round stage 510, depending on whether a new ciphertext block is to be processed, or processing remains to be performed on ciphertext blocks already in process within round stage 510. Multiplexer provides the selected information to an R unit 520. R unit 520 performs InvShiftRows processing on this information and stores the results in an R unit register 525. On the next clock cycle, R unit register 525 then provides this information to a B unit 527, which performs InvSubBytes processing on this information. B unit 527 then stores the results in an B unit register 530, which stores the information until such time as the information is processed by an K unit 535. On the next clock cycle, then, K unit 535 receives the information and performs AddRoundKey processing, storing the results in a K unit register 540. K unit register 540 then provides this information to a C unit 542 on the next clock cycle. C unit 542 then performs InvMixColumns processing on this information, storing the results in a C unit register 545.

C unit register 545 stores this information until such time as R unit 520 is ready to accept the information, as selected multiplexer 515.

As previously noted, the ciphertext block currently being processed also needs to be stored, for use by output stage 315. Round stage 510 provides this functionality via a number of registers (depicted in FIG. 5 as a register A 550, a register B 555, a register C 560, and register D 565). These registers store one of four ciphertext blocks until such time as the given ciphertext block is needed by output stage 315 in conjunction with the result of the subsequent ciphertext block being processed by round stage 510. At that time, a multiplexer 570 selects an output of the appropriate one of these registers, and provides that ciphertext block to output stage 315, for furthering processing. As will be appreciated, the storage of ciphertext blocks can be accomplished in a number of ways, only one of which is depicted in FIG. 5.

Output stage 315 receives the information generated by round stage 510 and the previous ciphertext block (the ciphertext block that was previous to that which round stage 510 used to generate the information generated). Output stage 315 performs the requisite post-processing, and outputs the results as plaintext 319. As will be appreciated, the architecture depicted in round stage 510 can be combined with the overall architecture of pipelined decryption unit 400 by replacing one or more of round stages 420(1)-(N) (which are comparable to round stage 310) with a round stage such as round stage 510. This ability to mix round stage architectures, perform single or multiple iterations, adjust data paths widths and the like provide the designer with a wide array of options when designing a pipelined decryption unit of the present invention. As will also be appreciated, the addition of registers to allow for pipelining can be used within pipelined decryption unit's submodules, so long as the register is placed at a point where a result (final, intermediate or otherwise) is, or can be made, available.

An Example of the Operation of a Pipelined Decryption Unit

Figure 6:
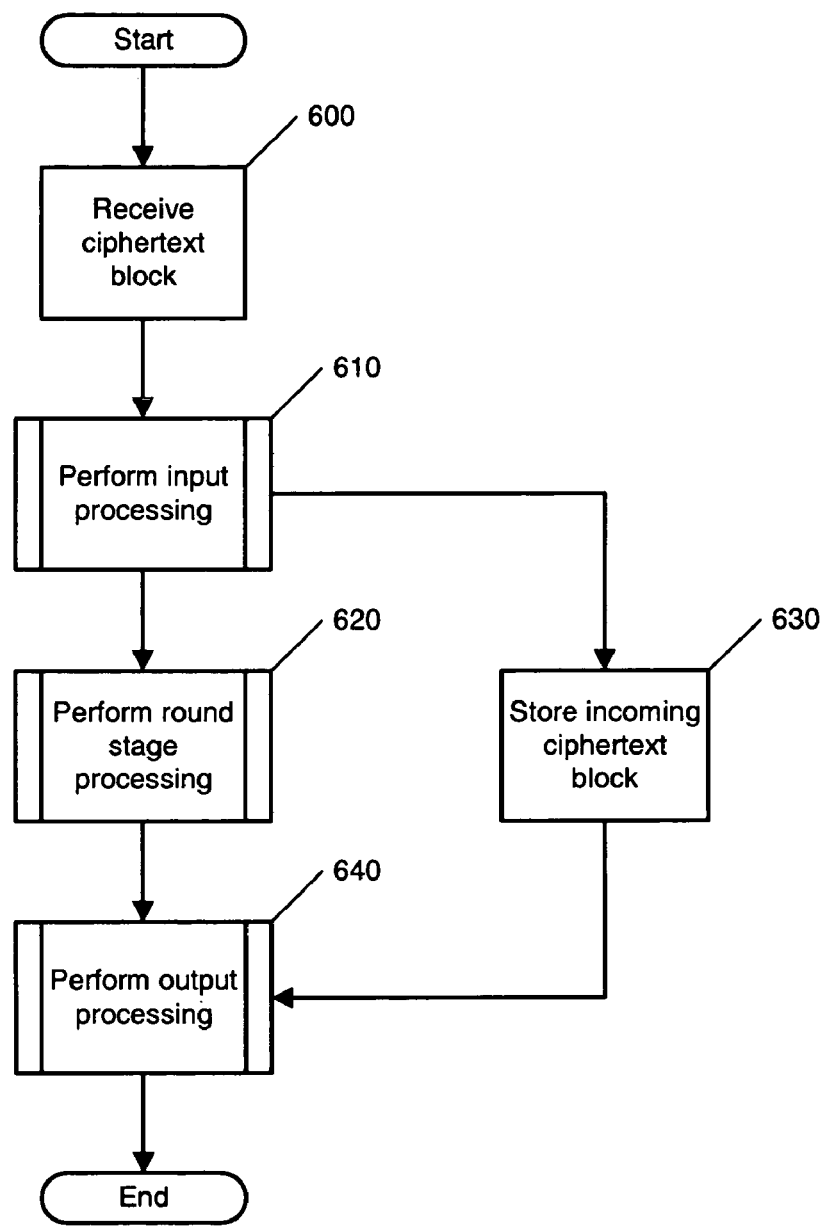
FIG. 6 is a flow diagram of an example method for performing pipelined decryption according to the present invention.

FIG. 6 is a flow diagram of an example method for performing pipeline decryption according to the present invention, such as the operation of pipelined decryption unit 300. The process begins with the receipt of a ciphertext block (step 600). Once a ciphertext block has been received, input processing is performed (step 610). Next, two sets of operations are performed. Round stage processing is performed on the ciphertext block (step 620), and a copy of the ciphertext block is stored (step 630). Once round stage processing has been completed, the resulting processed ciphertext block and the previous ciphertext block are received for output processing (step 640). The aforementioned input processing, round stage processing and output processing are now discussed, in greater detail, in connection with FIGS. 7, 8 and 9, respectively.

As noted, FIG. 6 depicts a flow diagram illustrating a process according to an embodiment of the present invention, as do the other flow diagrams presented herein. It is appreciated that operations discussed herein may consist of directly entered commands by a computer system user or by steps executed by application specific hardware modules or a combination thereof, and may be performed in any convenient and appropriate order. The functionality of steps referred to herein may correspond to the functionality of modules or portions of modules.

The operations referred to herein may be modules or portions of modules (e.g., software, firmware or hardware modules). For example, while the described embodiment includes field-programmable gate arrays, application specific integrated circuits and other such hardware modules, the various example modules may be implemented as software modules and/or include manually entered user commands. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a PLD (e.g., an FPGA), the design of a gate array or full-custom application-specific integrated circuit (ASIC), or the like.

Figure 7:
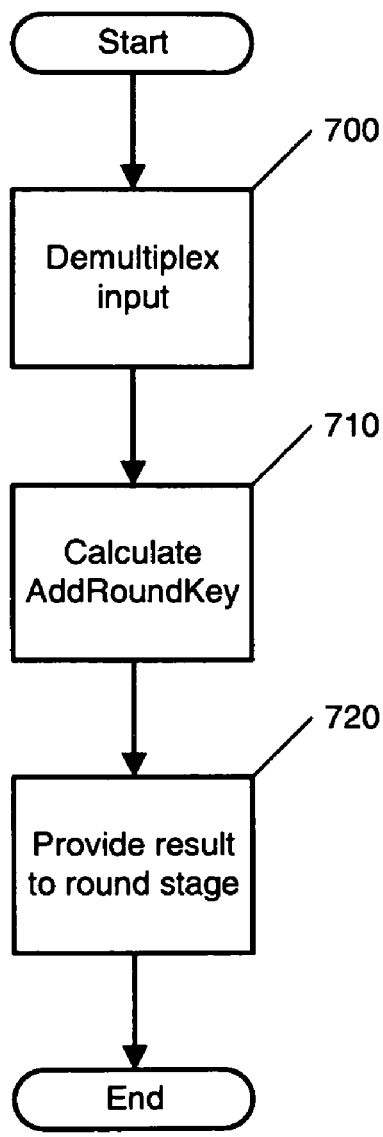
FIG. 7 is a flow diagram of input processing in a pipelined decryption method of the present invention.

FIG. 7 is a flow diagram illustrating input processing performed in the pipelined decryption unit of an embodiment of the present invention. The process begins by demultiplexing the ciphertext block received as an input (step 700). Once the ciphertext has been demultiplexed (and so converted from the word width received, into an appropriate word width), an AddRoundKey operation is performed on the demultiplexed ciphertext block (step 710). The results of the AddRoundKey operation, as well as the ciphertext block that preceded the processed ciphertext block, are then provided to a round stage for further processing after being temporarily stored in the appropriate register (step 720).

Figure 8:
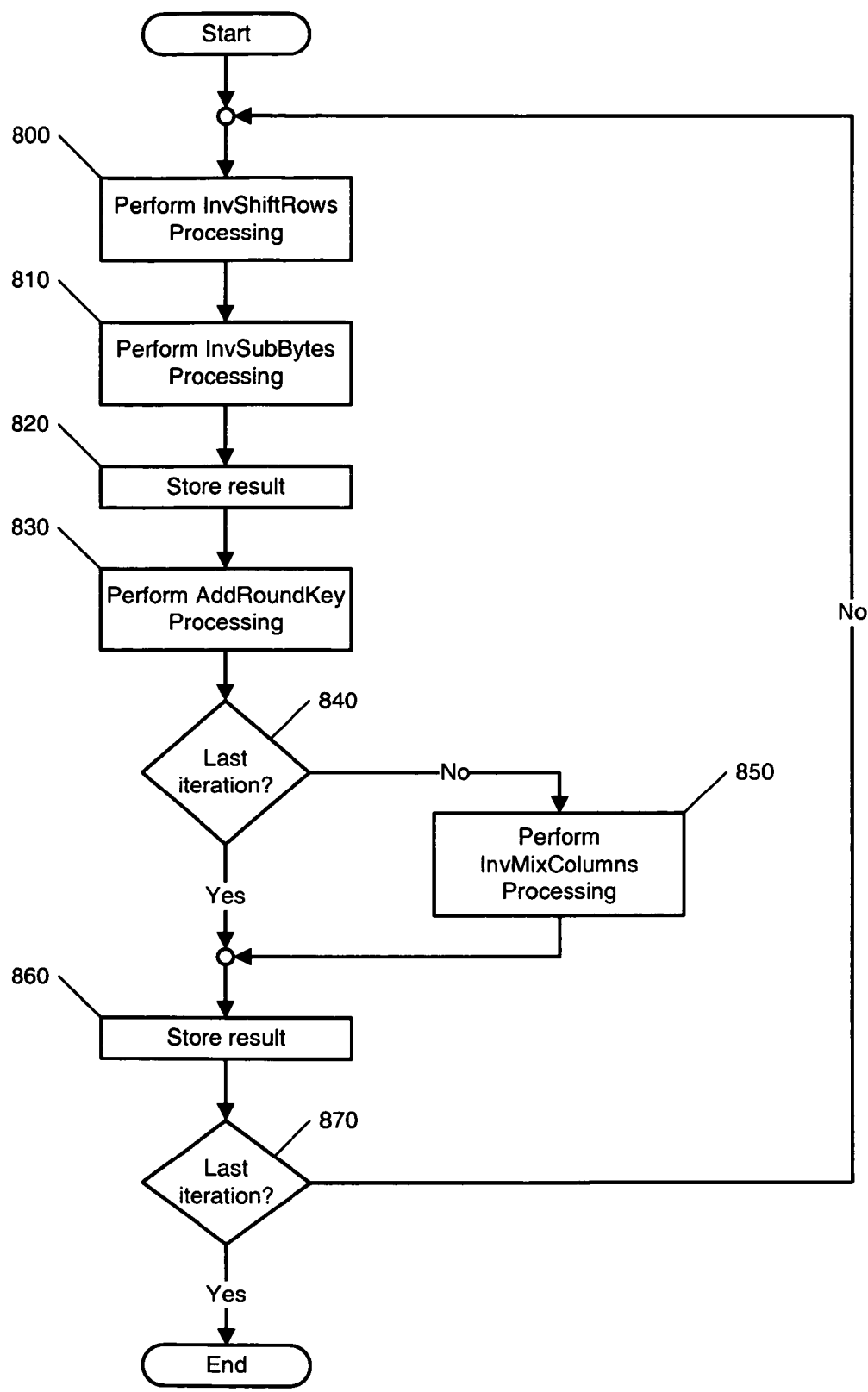
FIG. 8 is a flow diagram of round stage processing in a pipelined decryption method of the present invention.

FIG. 8 is a flow diagram illustrating round stage processing performed in a pipelined decryption unit according to an embodiment of the present invention. The process begins with InvShiftRows processing being performed on the pre-processed ciphertext block received from the input stage, as previously described (step 800). InvSubBytes processing is then performed (step 810). At this point, the result of the two foregoing processing steps is stored (step 820). As will be apparent, the storage of these results permits another such result to be calculated once the first result is passed on for further processing.

Next, AddRoundKey processing is performed (step 830). In one embodiment, if the iteration currently being performed is not the last iteration (step 840), InvMixColumns processing is then performed (step 850). However, if the current iteration is the last iteration (step 840) or InvMixColumns processing has completed (step 850), the results of the foregoing processing is stored (step 860). Again, the storage of this result allows the previous processing sections to begin processing a subsequent ciphertext block, in order to begin generating the next result.

Once this result has been stored, a determination is then made as to whether the current iteration is the last iteration in processing the given ciphertext block (step 870). If the current iteration is the last iteration, the process concludes. However, if further iterations remain to be performed, the process returns to performing InvShiftRows processing, and the other processing steps just described are again performed (steps 800-860). The process continues to loop while processing the given ciphertext blocks, until all such processing for a ciphertext block has been completed (step 870). In this manner, the information being processed is circulated within the given round stage until such information has been fully processed.

Figure 9:
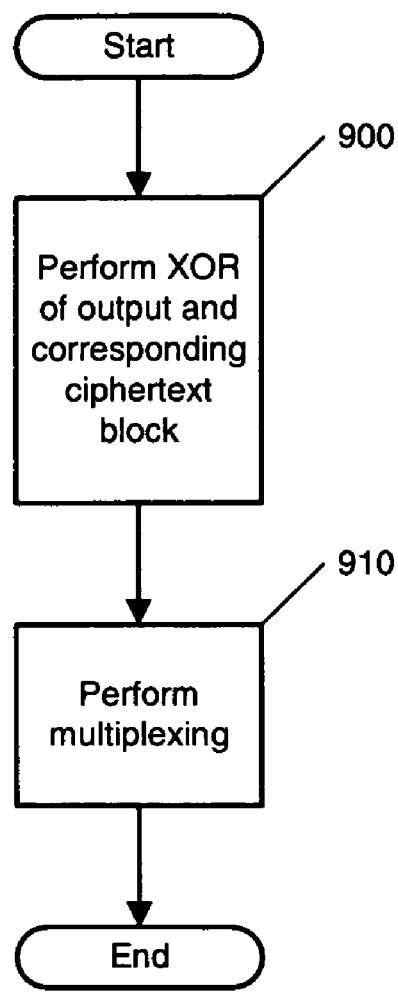
FIG. 9 is a flow diagram of output processing in a pipelined decryption method of the present invention.

FIG. 9 is a flow diagram of the output processing performed in a pipelined decryption unit according to an embodiment of the present invention. The process begins by performing an exclusive-OR (XOR) with the output of the round stage and the ciphertext block that preceded ciphertext block the corresponding to that result (step 900). The result of this XOR operation is then multiplexed from the ciphertext block width used within the pipelined decryption unit, to the data path width of the plaintext being output (step 910).

An Example Implementation in a Programmable Logic Device

Figure 10:
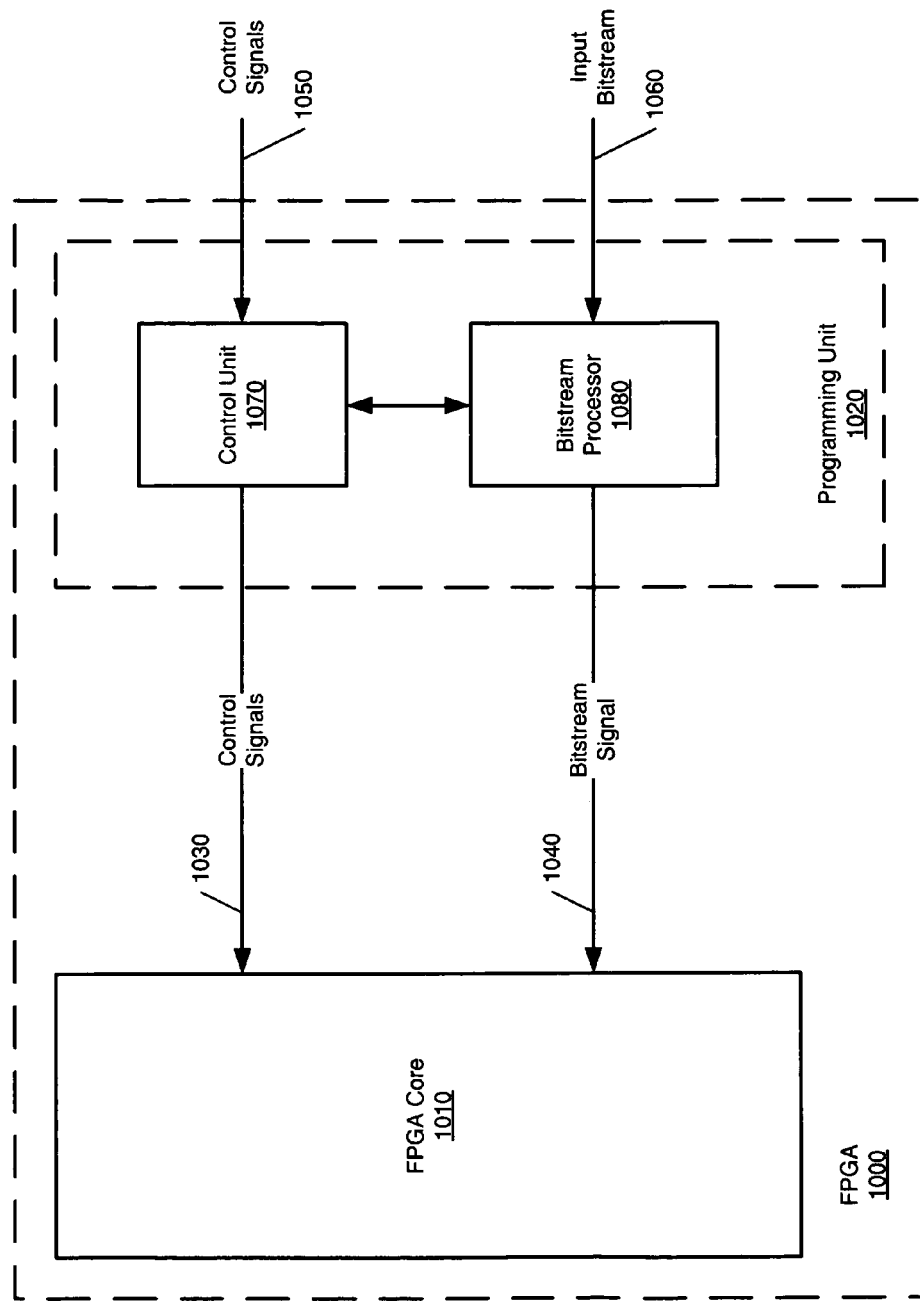
FIG. 10 is a block diagram illustrating an application of a pipelined decryption unit of the present invention in a programmable logic device.

FIG. 10 is a block diagram illustrating an application that employs a pipelined decryption unit of the present invention in a programmable logic device (PLD), such as a field-programmable gate array (FPGA) 1000. FPGA 1000 includes an FPGA core 1010 that is programmed by a programming unit 1020. Programming unit 1020 provides control signals 1030 and a bitstream signal 1040 to FPGA core 1010, which are received by FPGA core 1010 and used in configuring the various resources contained therein.

Programming unit 1020 receives control signals 1050 and an input bitstream 1060 from an external source (e.g., a programmable read-only memory (PROM) device). Usually, input bitstream 1060 is an encryption version of the bitstream to be programmed into FPGA core 1010. Thus, programming unit 1020 includes a control unit 1070 and a bitstream processor 1080. Among other functionalities provided, control unit 1070 and bitstream processor 1080 can be designed to include a pipelined decryption unit of an embodiment of the present invention. In particular, bitstream processor 1080 can receive input bitstream 1060 as the ciphertext taken as an input by a pipelined decryption unit. In such a case, a pipelined decryption unit within bitstream processor 1080 would decrypt input bitstream 1060, and provide this decrypted bitstream to FPGA core 1010 as bitstream signal 1040.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A circuit comprising an intermediate stage comprising:
   a storage section comprising a first plurality of storage units and coupled to receive ciphertext blocks at an input,
   a calculation section coupled in parallel with said storage section comprising a second plurality of storage units, and a plurality of calculation units coupled in series, wherein each storage unit of said second plurality of storage units corresponds to a calculation unit of said plurality of calculation units, and wherein each calculation unit of said plurality of calculation units is configured to perform a portion of a decryption operation on a different ciphertext block of said plurality of ciphertext blocks; and an output stage coupled to said storage section and said calculation section, wherein a ciphertext block of said plurality of ciphertext blocks stored in a storage unit of said first plurality of storage units and an output of said calculation section are received by said output stage.

2. The circuit of claim 1, wherein said second plurality of storage units and said calculation units are coupled in series with one another by virtue of:

each of said calculation units being directly coupled to a corresponding storage unit of said second plurality of storage units.

3. The circuit of claim 1, wherein said first plurality of storage units are coupled in parallel.

4. The circuit of claim 1, wherein said intermediate stage is configured to simultaneously process a plurality of ciphertext blocks.

5. The circuit of claim 4, wherein said storage section is configured to store a plurality of ciphertext blocks.

6. The circuit of claim 4, wherein said intermediate stage is a round stage.

7. The circuit of claim 2, wherein each one of said first plurality of storage units and each one of said second plurality of storage units are chosen from a group consisting of volatile and non-volatile memory circuits.

8. The circuit of claim 7, wherein each one of said first plurality of storage units and each one of said second plurality of storage units are registers.

9. The circuit of claim 2, wherein
said first plurality of storage units consists of a first number of said storage units,
said second plurality of storage units consists of a second number of said storage units, and
said first number and said second number are equal to one another.

10. The circuit of claim 9, wherein
said calculation units consists of a third number of calculation units, and
said first number, said second number and said third number are equal to one another.

11. The circuit of claim 1, wherein
an input of said storage section is coupled to a first input of said intermediate stage and an output of said storage section is coupled to a first output of said intermediate stage; and
an input of said calculation section is coupled to a second input of said intermediate stage and an output of said calculation section is coupled to a second output of said intermediate stage.

12. The circuit of claim 11, wherein each one of said first plurality of storage units is a register, and said storage section further comprises:

a selection unit, wherein an output of each one of said registers is coupled to one of a plurality of inputs of said selection unit.

13. The circuit of claim 11, wherein
an output of each one of said calculation units is coupled to an input of a corresponding one of said second plurality of storage units, and
an output of each one of said second plurality of storage units is coupled to an input of a corresponding one of said calculation units.

14. The circuit of claim 13, wherein said calculation section further comprises:

a selection unit, wherein
said selection unit is coupled between a last one of said second plurality of said storage units and a first one of said calculation units,
said last one of said second plurality of said storage units is coupled to a first input of said selection unit, and
an output of said selection unit is coupled to said first one of said calculation units.

15. The circuit of claim 14, wherein
said first one of said calculation units is an RB unit, and
said last one of said calculation units is a KC unit.

16. The circuit of claim 15, wherein
an output of said last one of said second plurality of said storage units is coupled to said first input of said selection unit,
an input of said last one of said second plurality of said storage units is coupled to an output of said KC unit,
an input of said RB unit is coupled to said output of said selection unit, and
an output of said RB unit is coupled to an input of said first one of said second plurality of said storage units.

17. The circuit of claim 16, wherein
said KC unit comprises said last one of said second plurality of said storage units, and
said RB unit comprises said first one of said second plurality of said storage units.

18. The circuit of claim 14, wherein
said first plurality of storage units consists of a first number of said storage units,
said second plurality of storage units consists of a second number of said storage units, and
said first number and said second number are equal to one another.

19. The circuit of claim 18, wherein
said calculation units consist of a third number of calculation units, and
said first number, said second number and said third number are equal to one another.

20. The circuit of claim 11, further comprising:
an input stage, coupled to said intermediate stage.

21. The circuit of claim 20, wherein said input stage comprises:
an input calculation unit;
a first storage unit; and
a second storage unit, wherein
said first storage unit and an input of said calculation unit are coupled to an input of said input stage,
an output of said input calculation unit is coupled to said second storage unit,
said first storage unit is coupled to said first input of said intermediate stage, and
said second storage unit is coupled to said second input of said intermediate stage.

22. The circuit of claim 21, wherein said input calculation unit is a K unit.

23. The circuit of claim 21, further comprising: an input X unit, coupled between said input of said input stage, and said input of said input calculation unit and said first storage unit.

24. The circuit of claim 20, wherein said output stage comprises:
an output calculation unit; and
a first storage unit, coupled to said output calculation unit.

25. The circuit of claim 24, wherein said output calculation unit comprises an XOR unit.

26. The circuit of claim 25, wherein said output calculation unit further comprises an output X unit.

27. The circuit of claim 26, wherein said output calculation unit further comprises said first storage unit.

28. The circuit of claim 11, further comprising:
a plurality of intermediate stages, wherein
said intermediate stages comprise said intermediate stage, and
each of said intermediate stages is coupled to at least one other of said intermediate stages.

29. The circuit of claim 28, wherein
an output of a first one of said intermediate stages is coupled to an input of a next one of said intermediate stages,
an input of a last one of said each of said intermediate stages is coupled to an output of a previous one of said intermediate stages,
an output of each remaining intermediate stage of said intermediate stages is coupled to an input of another remaining intermediate stage of said intermediate stages, and
said each remaining intermediate stage is one of said intermediate stages that is not one of said first one and said last one of said intermediate stages.

30. The circuit of claim 11, wherein
said circuit is configured to decrypt an encrypted configuration bitstream,
said decrypting of said encrypted configuration bitstream results in a configuration bitstream, and
said circuit is configured to be programmed by said configuration bitstream.

31. A circuit comprising:
at least one intermediate stage, wherein
said intermediate stage comprises a plurality of calculation units coupled in series to simultaneously perform a plurality of intermediate calculations, wherein an output of a last calculation unit of said plurality of calculation units is coupled to an input of a first calculation unit by way of a feedback path,
said intermediate stage is configured to store a result of each of said intermediate calculations,
each of said results is an input to a next one of said intermediate calculations,
said intermediate stage is configured to perform each of said intermediate calculations on a different ciphertext block of said plurality of ciphertext blocks to process a plurality of ciphertext blocks simultaneously, and
each of said intermediate calculations is an intermediate portion of a decryption operation, wherein said intermediate stage is configured to perform said intermediate calculations on each ciphertext block of said plurality of ciphertext blocks a plurality of times.

32. The circuit of claim 31, further comprising
an input stage, wherein
said input stage is coupled to said intermediate stage,
said input stage is configured to perform a first calculation, and
said first calculation is a first portion of said decryption operation; and
an output stage, wherein
said output stage is coupled to said intermediate stage,
said output stage is configured to perform a final calculation, and
said final calculation is a final portion of said decryption operation.

33. The circuit of claim 31, wherein said intermediate stage is a round stage.

34. The circuit of claim 33, wherein
said first one of said intermediate calculations is an RB operation, and
said last one of said intermediate calculations is a KC operation.

35. The circuit of claim 31, wherein said intermediate stage comprises:
a storage section, wherein
said storage section is configured to store a plurality of ciphertext blocks, and
said storage section is coupled at a first input to an input of said intermediate stage and said storage section is coupled at a first output to an output of said intermediate stage; and
a calculation section comprising said plurality of calculation units, wherein said calculation section is coupled at a second input to said input of said intermediate stage and said calculation section is coupled at a second output to said output of said intermediate stage.

36. The circuit of claim 35, wherein
said storage section comprises a first number of said storage units,
said calculation section comprises a second number of said storage units, and
said first number is equal to said second number.

37. The circuit of claim 35, wherein said storage section comprises:
a plurality of registers; and
a selection unit, wherein
each of said registers is coupled to one of a plurality of inputs of said selection unit, and
said selection unit is configured to select one of said registers.

38. The circuit of claim 35, wherein said calculation section comprises:
a plurality of storage units, coupled to said plurality of calculation units; and
a selection unit, wherein
a first one of said storage units is coupled to a first input of said selection unit, and
said first calculation unit is coupled to a first output of said selection unit.

39. The circuit of claim 38, wherein said calculation units and said storage units are coupled in series with one another.

40. The circuit of claim 39, wherein
said calculation section comprises a first number of calculation units and a second number of said storage units, and
said first number is not equal to said second number.

41. The circuit of claim 40, wherein said storage section comprises:
another plurality of storage units, wherein a number of said another plurality of storage units is equal to said second number.

42. A method comprising: sequentially, receiving a plurality of ciphertext blocks at an input,
simultaneously decrypting said plurality of Ciphertext blocks by a processor, said decrypting comprising
iteratively, generating a plurality of processed ciphertext blocks in wherein each of said processed ciphertext blocks corresponds to one of said ciphertext blocks, and wherein said iteratively generating a plurality of processed ciphertext comprises simultaneously performing a plurality of intermediate calculations,
storing a result of each of said intermediate calculations in a tangible storage media, and providing a result of each of said intermediate calculations to a next one of said intermediate calculations, wherein each of said results corresponds to one of said ciphertext blocks, and each of said intermediate calculations is an intermediate, portion of a decryption operation.

43. The method of claim 42, said decrypting further comprising:
storing each of said ciphertext blocks, wherein
said storing allows a plurality of ciphertext blocks to be processed.

44. The method of claim 42, said decrypting further comprising:
storing each of said ciphertext blocks, said storing resulting in stored ciphertext information.

45. The method of claim 44, said decrypting further comprising:
performing input processing on said ciphertext information prior to said iteratively generating a plurality of processed ciphertext blocks.

46. The method of claim 45, wherein said input processing comprises:
demultiplexing an input word into said ciphertext information; and
performing AddRoundKey processing on said ciphertext information.

47. The method of claim 44, said decrypting further comprising:
generating plaintext information by performing output processing on said processed ciphertext blocks.

48. The method of claim 47, said decrypting further comprising:
storing said processed ciphertext blocks after said performing said output processing.

49. The method of claim 47, said decrypting further comprising:
selecting one of said stored ciphertext blocks.

50. The method of claim 47, wherein said generating plaintext information is performed using said one of said stored ciphertext blocks.

51. The method of claim 47, wherein said output processing comprises:
generating said plaintext information by performing an XOR operation between one of said processed ciphertext blocks and said one of said stored ciphertext blocks, wherein
said one of said stored ciphertext blocks corresponds to a previous one of said ciphertext blocks, and
said previous one of said ciphertext blocks was received before one of said ciphertext blocks corresponding to said one of said processed ciphertext blocks.

52. The method of claim 42, wherein said generating comprises:
for each one of said processed ciphertext blocks,
generating a first intermediate result by performing first intermediate processing; and
generating a second intermediate result by performing second intermediate processing using said first intermediate result.

53. The method of claim 52, wherein said generating said first intermediate result comprises:
for each one of said processed ciphertext blocks, performing a first sub-processing operation and a second sub-processing operation.

54. The method of claim 53, wherein
said first sub-processing operation comprises InvShiftRows processing; and
said second sub-processing operation comprises InvSubBytes processing.

55. The method of claim 52, said decrypting further comprising:
selecting either an output of an input stage or said second intermediate result.

56. The method of claim 52, wherein said storing said result of each of said intermediate calculations comprises:
storing said first intermediate result after said generating said first intermediate result; and
storing said second intermediate result after said generating said second intermediate result.

57. The method of claim 52, wherein said generating said second intermediate result further comprises:
performing a first sub-processing operation.

58. The method of claim 57, wherein said generating said second intermediate result comprises:
determining whether an iteration being performed is a last iteration; and
if said iteration being performed is not said last iteration, performing a second sub-processing operation.

59. The method of claim 58, wherein said first sub-processing operation comprises AddRoundKey processing.

60. The method of claim 59, wherein said second sub-processing operation comprises InvMixColumns processing.

61. The method of claim 42, said decrypting further comprising: generating a configuration bitstream by performing a decryption operation on an encrypted configuration bitstream, wherein said decryption operation comprises said decrypting.

62. The method of claim 61, said decrypting further comprising:
programming a programmable logic device using said configuration bitstream.

63. An apparatus comprising:
means for sequentially receiving a plurality of ciphertext blocks,
means for simultaneously decrypting said plurality of ciphertext blocks, said means for simultaneously decrypting comprising
means for generating a plurality of processed ciphertext blocks, wherein
each of said processed ciphertext blocks corresponds to one of said ciphertext blocks,
said means for generating comprising
a plurality of means for simultaneously performing an intermediate calculation, and
means for providing a result generated by each of said plurality of means for simultaneously performing an intermediate calculation to a next one of said plurality of means for simultaneously performing an intermediate calculation,
each of said results corresponds to one of said ciphertext blocks, and
each means of said plurality of means for simultaneously performing an intermediate calculation is configured to perform an intermediate portion of a decryption operation; and
means for storing a result of each means of said plurality of means for simultaneously performing an intermediate calculation.

64. The apparatus of claim 63, said means for simultaneously decrypting further comprising:
means for storing each of said ciphertext blocks as stored ciphertext information.

65. The apparatus of claim 64, further comprising:
means for performing input processing on said ciphertext information coupled to said means for generating.

66. The apparatus of claim 65, wherein said means for performing input processing comprises:
means for demultiplexing an input word into said ciphertext information; and
means for performing AddRoundKey processing on said ciphertext information.

67. The apparatus of claim 64, said means for simultaneously decrypting further comprising:
means for generating plaintext information comprising means for performing output processing on said processed ciphertext blocks.

68. The apparatus of claim 67, wherein said means for performing output processing comprises:
means for generating said plaintext information comprising means for performing an XOR operation between one of said processed ciphertext blocks and one of said stored ciphertext blocks, wherein
said one of said stored ciphertext blocks corresponds to a previous one of said ciphertext blocks, and
said previous one of said ciphertext blocks was received before one of said ciphertext blocks corresponding to said one of said processed ciphertext blocks.

69. The apparatus-of claim 63, wherein said, means for generating comprises:
means for generating a first intermediate result for each one of said processed ciphertext blocks comprising means for performing first intermediate processing; and
means for generating a second intermediate result for reach one of said processed ciphertext blocks comprising means for performing second intermediate processing using said first intermediate result.

70. The apparatus of claim 69, wherein said means for generating said first intermediate result comprises:
means for performing a first sub-processing operation on each one of said processed ciphertext blocks; and
means for performing a second sub-processing operation on each one of said processed ciphertext blocks, wherein
said first sub-processing operation comprises InvShiftRows processing; and
said second sub-processing operation comprises InvSubBytes processing.

71. The apparatus of claim 69, wherein said means for generating said second intermediate result further comprises:
means for performing a first sub-processing operation.

72. The apparatus of claim 71, wherein said means for generating said second intermediate result comprises:
means for determining whether an iteration being performed is a last iteration; and
means for performing a second sub-processing operation, if said iteration being performed is not said last iteration.

73. The apparatus of claim 72, wherein
said first sub-processing operation comprises AddRoundKey processing; and
said second sub-processing operation comprises InvMixColumns processing.

74. The apparatus of claim 63, said means for simultaneously decrypting further comprising:
means for generating a configuration bitstream comprising means for performing a decryption operation on an encrypted configuration bitstream, wherein said means for performing said decryption operation Comprises said means for decrypting.

75. The apparatus of claim 74, said means for simultaneously decrypting further comprising:
means for programming programmable logic of a circuit using said configuration bitstream.

76. The circuit of claim 14, wherein
said first one of said calculation units is an R unit,
a second one of said calculation units is an B unit,
a third one of said calculation units is an K unit, and
said last one of said calculation units is a C unit.

* * * * *

UNITED STATES PATENT AND TRADEMARK OFFICE
CERTIFICATE OF CORRECTION

| | |
|---|---|
| PATENT NO. | : 7,623,660 B1 |
| APPLICATION NO. | : 11/048443 |
| DATED | : November 24, 2009 |
| INVENTOR(S) | : Warren E. Cory |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1308 days.

Signed and Sealed this

Twenty-sixth Day of October, 2010

David J. Kappos
*Director of the United States Patent and Trademark Office*